United States Patent [19]

Halyo et al.

[11] Patent Number: 5,098,195
[45] Date of Patent: Mar. 24, 1992

[54] DIRECTIONAL SPECTRAL EMISSIVITY MEASUREMENT SYSTEM

[75] Inventors: Nesim Halyo, Williamsburg; Dhirendra K. Pandey, Hampton, both of Va.

[73] Assignee: Information and Control Systems, Inc., Hampton, Va.

[21] Appl. No.: 606,164

[22] Filed: Oct. 31, 1990

[51] Int. Cl.$^5$ .................... G01N 21/63; G01N 25/00
[52] U.S. Cl. ........................................ 374/9; 374/10; 374/12
[58] Field of Search ................ 374/9, 10, 12; 356/43; 250/340, 341, 338.1, 349

[56] References Cited

U.S. PATENT DOCUMENTS

| | | | |
|---|---|---|---|
| 3,069,893 | 12/1962 | Kerrstetter | 374/9 |
| 3,179,805 | 4/1965 | Astheimer | 374/9 |
| 3,277,715 | 10/1966 | Vanderschmidt | 374/9 |
| 3,340,722 | 9/1967 | Gabron | 374/9 |
| 3,401,263 | 9/1968 | Birkebak | 374/9 |
| 3,539,807 | 11/1968 | Bickel | 374/9 |
| 3,968,813 | 10/1972 | Alsenberg | 356/48 |
| 4,498,765 | 2/1985 | Herve | 356/43 |
| 4,800,280 | 1/1989 | Sataka | 250/339 |

FOREIGN PATENT DOCUMENTS 0030773 6/1981 European Pat. Off. ................ 374/9

OTHER PUBLICATIONS

Rogers, R. N. et al., "Determination of Emissivities with a Differential Scanning Calorimeter," Analytical Chemistry, vol. 38, No. 3 (Mar. 1966), pp. 410–412.
Aisenberg, S. et al., "A system for the measurement of the absorptivity and emissivity of a vehicle during flight conditions," Proc. 5th Annual ISA Test Meas. Symp., Advances in Test Measurements, New York, U.S.A. (Oct. 1968).

Primary Examiner—William A. Cuchlinski, Jr.
Assistant Examiner—Diego F. F. Gutierrez
Attorney, Agent, or Firm—Wallace J. Nelson

[57] ABSTRACT

Apparatus and process for determining the emissivity of a test specimen including an integrated sphere having two concentric walls with a coolant circulating therebetween, and disposed within a chamber which may be under ambient, vacuum or inert gas conditions. A reference sample is disposed within the sphere with a monochromatic light source in optical alignment therewith. A pyrometer is in optical alignment with the test sample for obtaining continuous test sample temperature measurements during a test. An arcuate slit port is provided through the spaced concentric walls of the integrating sphere with a movable monochromatic light source extending through and movable along the arcuate slit port. A detector system extends through the integrating sphere for continuously detecting an integrated signal indicative of all radiation within its field of view, as a function of the emissivity of the test specimen at various temperatures and various angle position of the monochromatic light source. A furnace for heating the test sample to approximately 3000 K. and control mechanism for transferring the heated sample from the furnace to the test sample port in the integrating sphere is also contained within the chamber.

18 Claims, 5 Drawing Sheets

DIRECTIONAL SPECTRAL EMISSIVITY MEASUREMENT SYSTEM

ORIGIN OF THE INVENTION

This invention was made with Government support under Contract NAS1-16478 awarded by NASA. The Government has certain rights in this invention.

FIELD OF THE INVENTION

This invention relates to measuring systems in general and relates specifically to an emissivity measurement system employing a specific integrating sphere configuration.

BACKGROUND OF THE INVENTION

The use of materials in high temperature environments is required in a variety of applications such as re-entry vehicles, jet propulsion systems, hypersonic tunnels, nuclear reactors, solar energy, and the like. Thermal analysis in these areas requires a knowledge of the surface radiative properties of the materials at high temperatures. The accurate retrieval of surface temperatures, as well as radiative heat losses, requires knowledge of the spectral emissivity of these materials at corresponding temperatures. These emissivity measurements depend on parameters such as the temperature of the surface, geometry of the surface, chemical composition of the sample, state of the sample environment and the direction, wavelength and polarization of incoming thermal radiation.

The spectral emissivity of a surface, with values varying from zero to unity, is defined as the ratio of the radiation emitted from a surface to that of a blackbody at the same temperature and wavelength. Various emissivity measurement systems, including the use of a coated integrating sphere, are well documented in the literature. The integrating sphere has the ability of collecting all reflected radiation, while removing any directional preferences, and presenting an integrated signal to the detector.

In the present invention an improved emissivity measurement system employing a novel integrating sphere has been developed.

Accordingly, one object of the present invention is to provide a novel emissivity measurement system.

Another object of the present invention is a high temperature directional spectral emissivity measurement system for opaque surfaces employing an integrating sphere.

A further object of the present invention is an improved accuracy directional spectral emissivity measurement system employing a monochromatic light source.

An additional object of the present invention is a novel sample heating and placement system for use with an integrating sphere emissivity measurement system.

Another object of the present invention is a novel movable monochromatic light assembly for use with an integrating sphere.

A further object of the present invention is a system for measuring the surface emissivity of a high temperature test sample at any elevated temperature, at any wavelength and at any angle.

SUMMARY OF THE INVENTION

According to the present invention, the foregoing and additional objects are attained in the preferred embodiment of the invention by providing a closed system chamber having an integrating sphere formed of a pair of spaced concentric walls with a coolant circulating between the spaced walls for cooling thereof. A furnace for heating a test sample and apparatus to transfer the test sample to a test sample port on the wall of the integrating sphere are also provided within the system chamber.

The interior of the closed system chamber may be under ambient conditions, under vacuum, or filled with an inert gas. A reference sample is disposed within the integrating sphere with a fixed monochromatic light source in optical alignment with the reference sample. A pyrometer is in optical alignment with the test sample port to continuously measure the temperature of the test sample during a test. An arcuate slit port is provided through the spaced concentric walls of the integrating sphere with a movable monochromatic light source extending through and movable along the arcuate slit port. A detector system also extends through the integrating sphere for continuously detecting an integrated signal indicative of all radiation within its field of view, which is a function of the emissivity of the test specimen at various temperatures and various angle positions of the monochromatic light source.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein.

DETAILED DESCRIPTION

Figure 1:
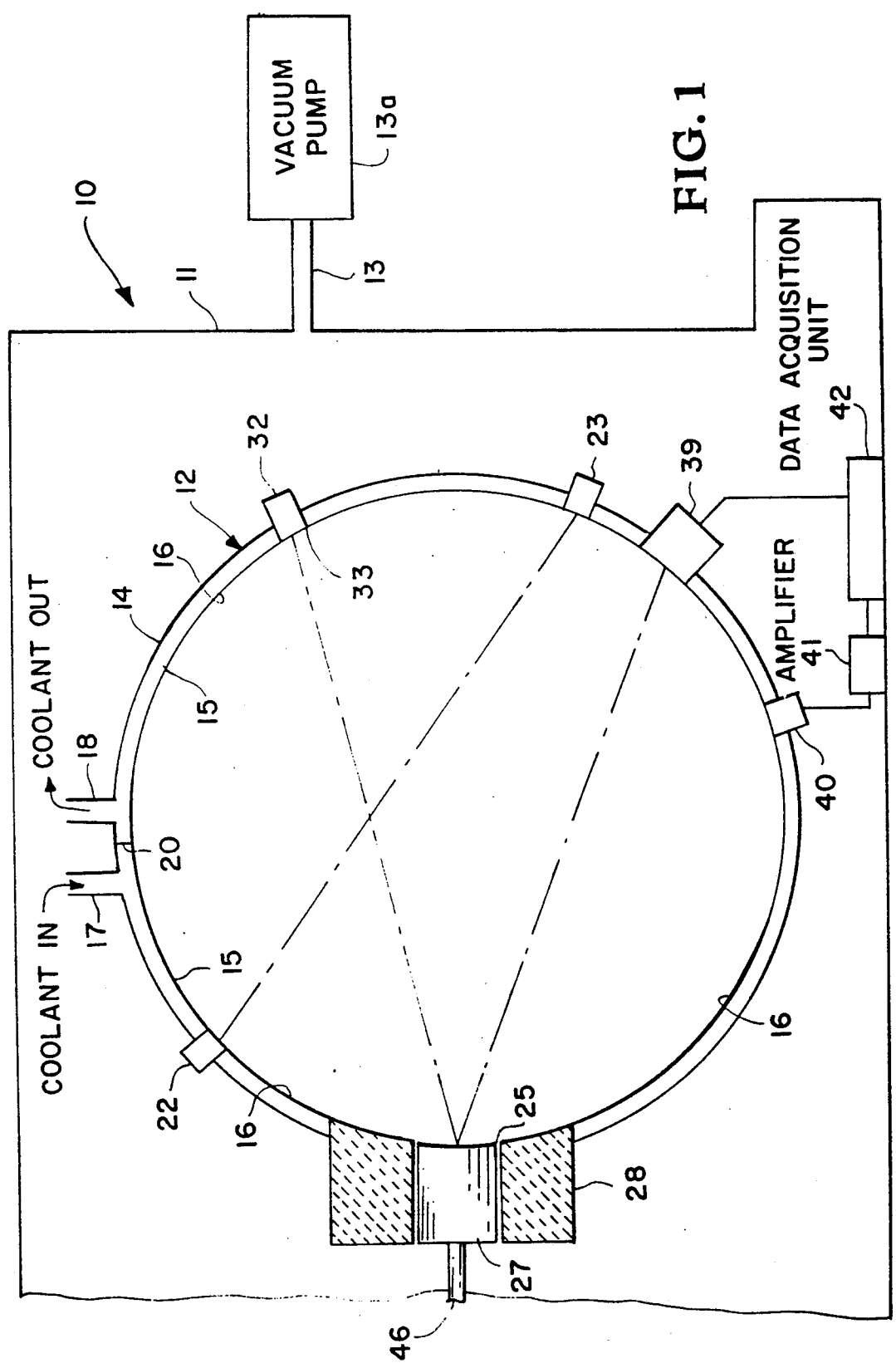
FIG. 1 is a part sectional, part schematic representation of the integrating sphere and part of the system chamber employed in the spectral emissivity measurement system of the present invention.

Referring now to the drawings and more particularly to FIG. 1, the directional spectral emissivity measurement system of the present invention is shown and designated generally by reference numeral 10. Measurement system 10 includes a closable chamber 11 housing an integrating sphere 12 therein. When closed, chamber 11 may be maintained under a vacuum through connection 13 leading to a suitable vacuum pump 13a. Integrating sphere 12 is formed of a pair of spaced concentric walls 14,15. The interior surface of wall 15, forming the interior of sphere 12, is provided with a suitable highly reflective coating 16, as will be further explained hereinafter. A coolant inlet 17 and a coolant outlet 18 connected, respectively, to a suitable coolant source and a suitable disposal or recirculating unit (not shown), serve to maintain the space between walls 14,15 filled with a circulatinng coolant fluid during test procedures with the present invention. A plurality of spacers or baffles, one of which is schematically shown and designated by reference numeral 20, serve to maintain the concentric relationship of walls 14,15 and to direct the flow of coolant therebetween.

A reference sample 22 and a fixed monochromatic light source 23 are disposed in spaced optical alignment within integrating sphere 12. A test sample port 25 extends through the spaced walls 14,15 for housing a test sample material 27. Test sample port 25 is surrounded by a tubular insulation sleeve 28. As illustrated, and as will be further explained hereinafter, support rod 46 maintains test sample 27 in spaced relationship within tubular insulation sleeve 28. A movable monochromatic light source 32 extends through an arcuate slit port 33, as will also be further explained hereinafter. An optical pyrometer 39 extends through a port in integrating sphere 12 and is disposed in spaced optical alignment with test sample port 25. A detector 40 also extends through spaced concentric walls 14,15 of integrating sphere 12. Detector 40 serves to detect separate data measurements from reference sample 22, test sample 27 positioned within test sample port 25, while the respective monochromatic light sources for these samples are in both the on and off modes, along with temperature measurements of test sample 25 from pyrometer 39. Detector 40 is operable at various temperatures of the test sample and at various angle positions of the monochromatic light source relative to test sample 27. The analog signals received by detector 40 are amplified by amplifier 41 and transferred to data acquisition system 42 where the analog signals are converted to digital signals and, through the use of suitable computer mechanism, converted to emissivity readings.

Figure 2:
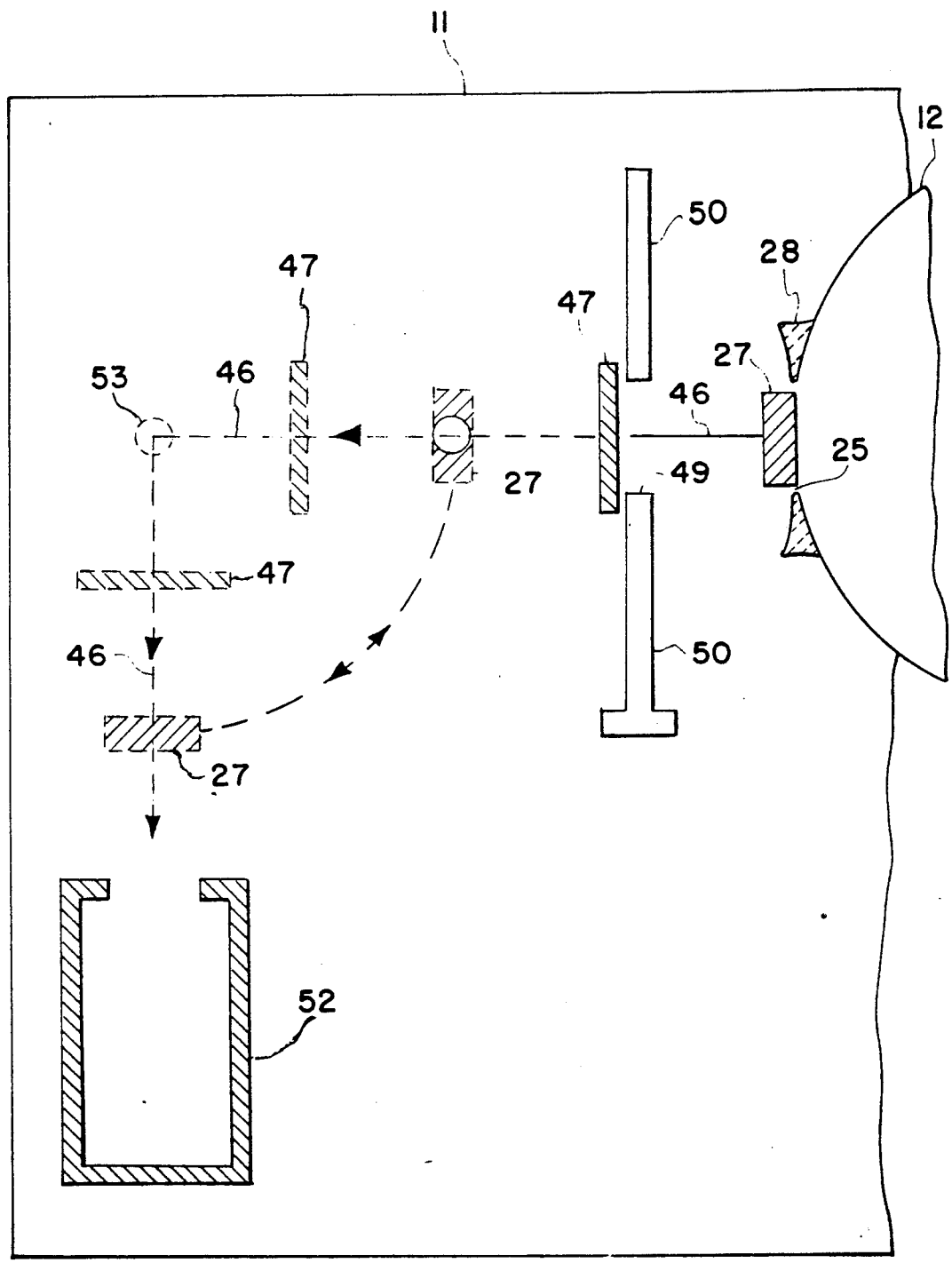
FIG. 2 is a schematic representation of the remaining part of the system chamber shown in FIG. 1 and illustrating the furnace and test sample transfer apparatus for positioning a test sample taken from the furnace to the sample port of the system shown in FIG. 1.

Referring now more particularly to FIG. 2, a schematic representation of the test sample heating and transfer mechanism, housed within chamber 11, is shown. As shown therein, sample 27 is connected to a support rod 46 having a spaced closure element 47 also fixed thereto. Sample 27, as shown, is positioned within test sample port 25 of integrating sphere 12 with closure 47 serving to close opening 49 provided in black wall 50. Sample 27 is transferred through black wall 50 prior to entering sample test port 25 of sphere 12. Black wall 50 ensures that any light from the movable monochromatic light source 32 that does not strike test sample 27 (Note FIGS. 3 and 4) is not reflected back into the sphere.

Figure 4:
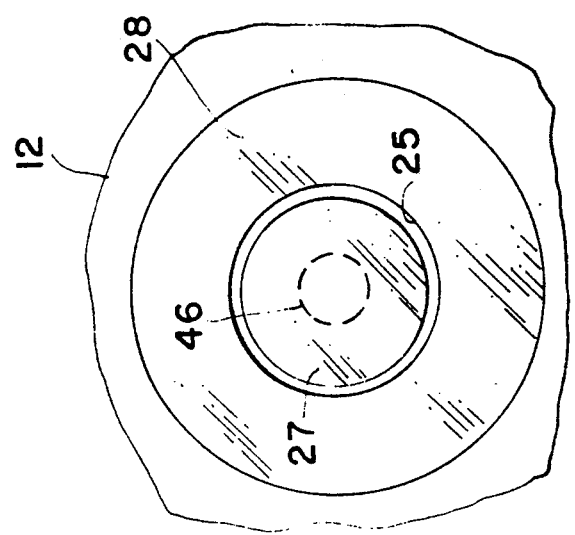
FIG. 4 is a partial view of the sample port and test sample looking in the direction of arrow IV of FIG. 3.
Figure 3:
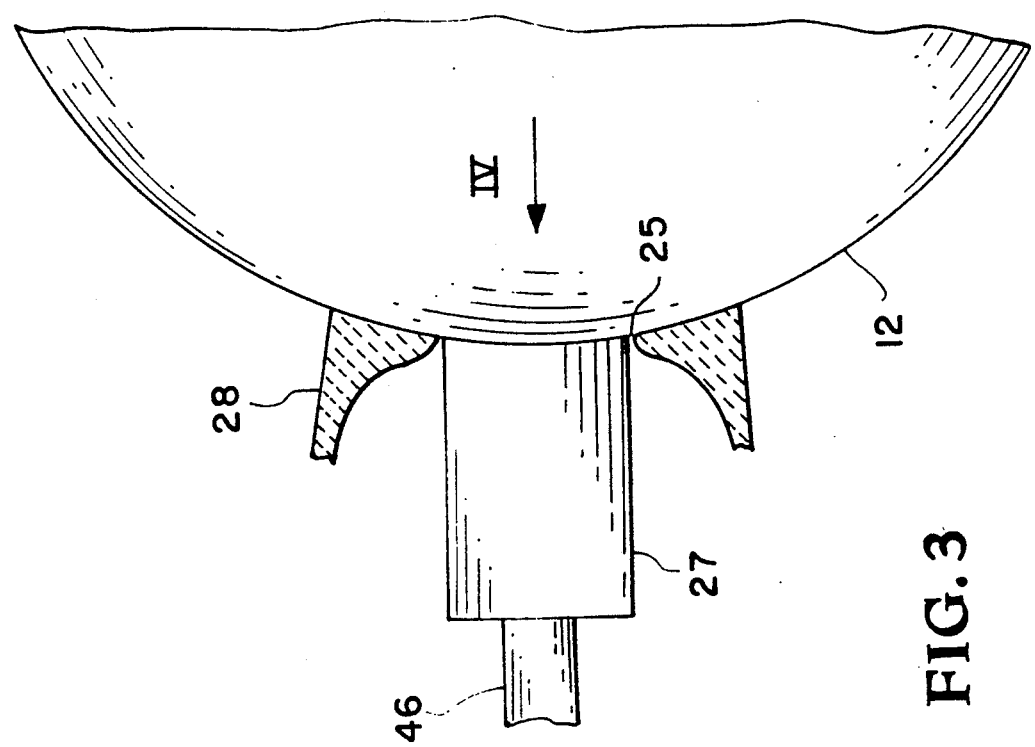
FIG. 3 is an enlarged side view of the measurement system sample port illustrating the sample placement therein.

Prior to positioning of test sample 27 into test sample port 25, the sample is heated in a thermal gage tubular furnace 52 to the desired temperature, up to for example, 3000K. Thermal gage tubular furnace 52 is provided with a sample positioning and control mechanism 53 as will be further explained hereinafter. Other heating methods such as (1) passing an electric current through the sample or (2) pulse heating may be employed to raise the temperature of test sample 27 to the desired level. Closure element 47, attached to rod 46, serves to close furnace 52 during heating of the sample. After sample 27 reaches the desired test temperature, a suitable control mechanism 53 is actuated to remove sample 27 from furnace 52, in rack and pinion or equivalent fashion, and rotate linear support rod 46 and test sample 27 to the horizontal position and in alignment with test sample port 25 in integrating sphere 12. Control mechanism 53 then moves sample 27 into port 25, as illustrated in FIGS. 2-4 of the drawing, with closure element 47 abutting and closing opening 49 in black wall 50. After a test, the control mechanism 53 is again actuated in reverse to again place sample 27 in furnace 52. Control and positioning mechanism 53 may be operated manually, or by automatic structure such as pneumatic, electrical or other conventional power control.

When placing the hot (approximately 3000K) test sample 27 within port 25, it would be expected that heat conducted through the spaced concentric walls 14,15 would modify the radiative properties and temperature uniformity of reflective coating 16. To avoid overheating and/or melting of the sphere material surrounding sample port 25, the uncoated portions of sphere walls 14,15 are formed of tungsten, carbon composite materials or similar highly temperature resistant materials. In addition, sandblasting is employed to render the uncoated portions of the walls as highly diffuse as possible. Also, the tubular insulation sleeve 28 is formed of a suitable ceramic material to prevent heat loss of the sample. One suitable ceramic material useful for this structure and employed in the preferred embodiment of the present invention is a ceramic formed of a mixture of Magnesium(MgO) and Yttria($Y_2O_3$) that has a working temperature of approximately 2700K and is available from Labsphere, Inc., P. O. Box 70, North Sutton, N.H. 03260. The circulating water coolant flowing between concentric walls 14,15 also aids in maintaining the temperature of integrating sphere 12 within a temperature range that does not adversely affect the radiative properties of reflective coating 16. By performing the test measurements as quickly as possible, the uncertainty caused by drastic temperature changes in the test sample is minimized.

Test sample 27 is positioned within sample port 25 in integrating sphere 12 while hot. The end of test sample 27 facing the interior of sphere 12 thus essentially, becomes a part of the sphere wall and error analysis of measurements thereof can be easily computed by using the integrating sphere theory.

Reference sample 22 may be selected from any material surface having a known and accurately measured reflectivity. The reflectivity of test sample 27 is measured with reference to the known reflectivity of the reference sample 22. The surface of the reference sample should preferably be diffuse. Commercially available reference samples of Barium Sulfate and Gold plating material may also be obtained from Labsphere, Inc., under the respective tradenames of Spectraflect and Infragold. Spectraflect is preferred for the visible and near infrared and Infragold is preferred for infrared and higher wavelengths. Instead of using a commercially available reference sample, the present invention is equally operable when using a portion of the integrating sphere wall as a reference surface.

A conventional self-calibrating optical pyrometer 39 manufactured by the Williamson Corporation of Massachusetts is employed to record the sample temperature. At low temperatures a conventional thermocouple may be employed to record sample temperatures.

Fixed monochromatic light source 23 and movable monochromatic light source 32, each has a bandwidth of 0.5 $\eta$m and 10.0 W power. Light sources having a smaller bandwidth and higher power are also operable with the present invention and would decrease the error in emissivity measurements. The reflectance property of the reference sample is a very important parameter and it may change over time due to the high temperature environment. It is thus essential to continually measure and know the reflectivity of the reference sample as the temperature of the test sample changes. The movable monochromatic light source 32 permits irradiation of the test sample 27 at any desired incident angle.

A total radiometer, provided with a variable filter, that covers the complete wavelength region of 0.2 to 25 $\mu$m is preferable for use as detector 40. The detector field of view is selected so that the position of the integrating sphere wall viewed has no visible ports. Also, the fixed and movable monochromatic light sources, 23 and 32, are disposed such that they do not directly illuminate the detector foot print. Although a total radiometer having a variable filter is preferred, other detectors which cover the wave band of measurement, such as a HgCd detector, a photo-multiplier and a Fourier transform infrared radiometer may be employed to measure the reflected radiation from the integrating sphere wall.

Figure 5:
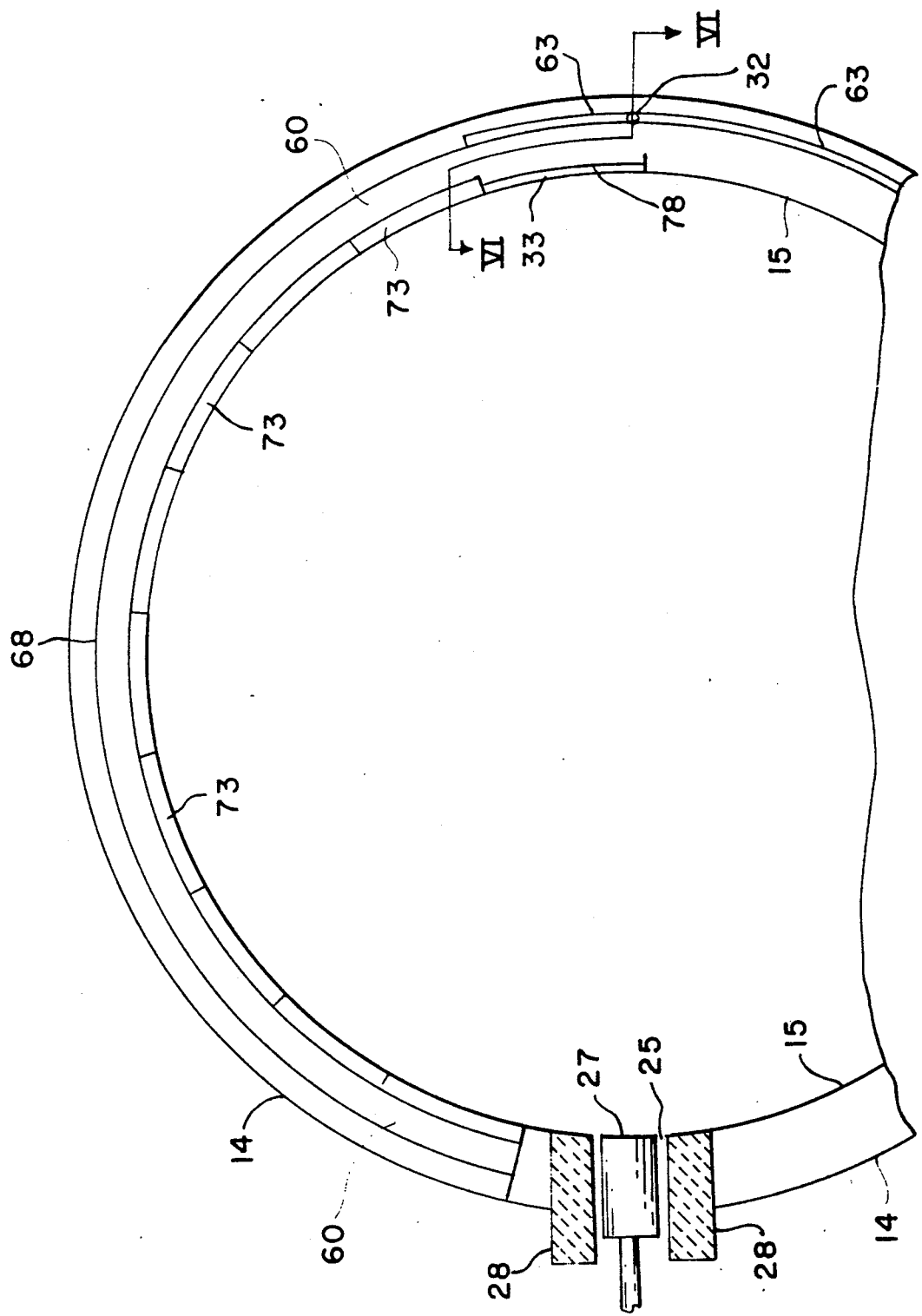
FIG. 5 is a part sectional, part schematic, view of another portion of the integrating sphere shown in FIG. 1 and illustrating the movable monochromatic light source, the closure mechanism for the slit port supporting the movable monochromatic light source, and the auxiliary slit port closure mechanism.
Figure 7:
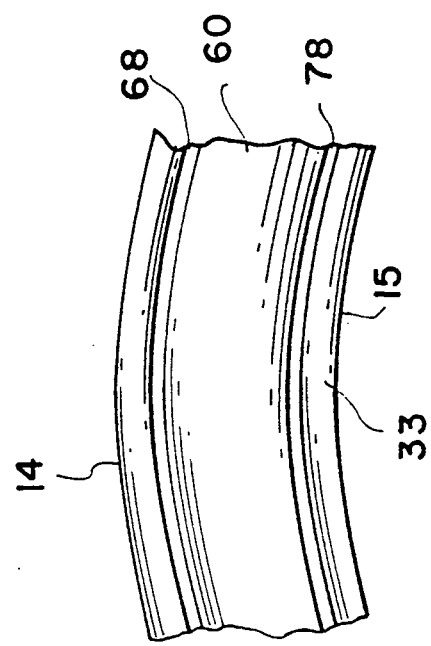
FIG. 7 is a view of one of the barrier walls taken along line VII—VII of FIG. 6 with parts omitted and illustrating the grooving therein to facilitate the slidable movement of the slit port closure and auxiliary slit port closure mechanism.
Figure 6:
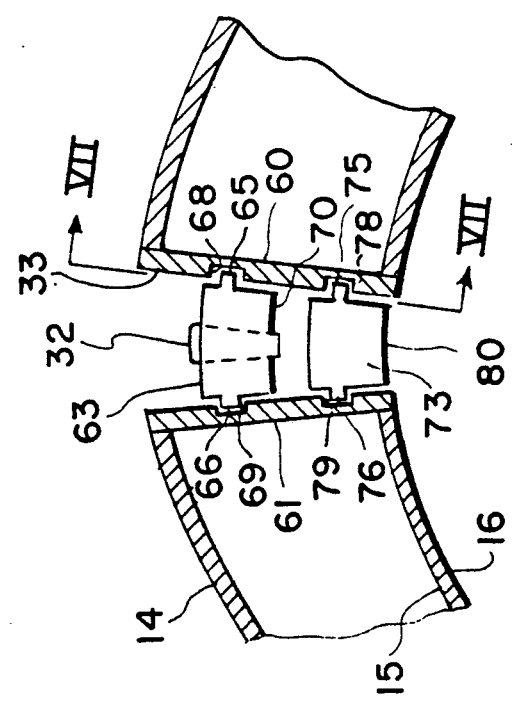
FIG. 6 is a sectional view taken along line VI—VI of FIG. 5 and illustrating the closure and auxiliary closure mechanisms for the movable monochromatic light slit port.

Referring now more particularly to FIGS. 5–7, the details of movable monochromatic light 32 will now be described. As shown therein, a pair of barrier walls 60,61 extend about a portion or all of the circumferential exterior surface of integrating sphere 12. Barrier walls 60,61 extend diametrically from inside concentric wall 15 to the exterior wall 14. At least a portion of inside wall 15 is removed along the length of barrier walls 60,61 to form slit port 33. Slit port 33 may extend up to at least 160 degrees of the circumference of sphere 12 to permit movable light source 32 to be selectively moved from a position diametrically opposite to test sample port 25 to a position as close to test sample 27 that permits light 32 to be focused onto the sample without overflowing of the sample.

Movable monochromatic light source 32 is attached to, and movable with, a thin arcuate slit closure member 63 extending from each side thereof. Slit port closure 63 is provided with a pair of horizontally extending ears or lands 65,66. Lands 65,66 are slidably received within grooves 68,69 formed within respective barrier walls 60,61. This structure permits slidable movement of movable monochromatic light source 32 from a position diametrically opposed to test sample 27, along the circumference of sphere 12, toward test sample 25 to vary the angular incidence of light reaching the sample. The side of slit port closure 63 facing the interior of sphere 12 is provided with a reflective coated surface 70 thereon identical to the coating surface 16 provided on the interior surface of wall 15.

A segmented auxiliary slit port closure 73, also having a thin arcuate configuration, is provided with a pair of horizontally extending ears or lands 75,76 on each segment thereof. Lands 75,76 are slidably received within respective grooves 78,79 formed within respective barrier walls 60,61. Grooves 78,79 are spaced from groove pair 68,69 a distance adequate to permit movable monochromatic light source 32 and the attached slit port closure element 63, to slidably move over segmented auxiliary slit port closure 73. Also, the segments of auxiliary slit port closure 73 may individually slide beneath slit port closure 63, as will be further explained hereinafter. The side of each segment of auxiliary slit port closure 73 facing the interior of sphere 12 is provided with a reflective coating surface 80 identical to the coating surface 16 provided on the interior of wall 15.

OPERATION

The operation of the invention is believed apparent from the above detailed description. System 10 is set up, under vacuum via vacuum pump 13a, as shown in FIGS. 1 and 2. System 10 may also be set up under other environments including atmospheric pressure or under suitable inert gas pressure such as argon, helium, and the like. Sample 27 is heated in tubular furnace 52 and transferred to test sample port 25 in integrating sphere 12. Other suitable heating mechanisms may be employed to heat sample 27 prior to or after being mounted within test sample port 25. As mentioned hereinbefore, sample 27 is mounted within test sample port 25, spaced from the interior of insulating sleeve 28 and, such that the end surface thereof is flush with and forms a part of the integrating sphere inside wall. The sphere wall is cooled by a circulating coolant, such for example tap water, entering coolant inlet 17, circulating between spaced walls 14,15 and exiting via coolant outlet 18. Multiple coolant inlets and coolant outlets may be provided in different sections of sphere 12 when so needed. In some instances, it may be desirable for barrier walls 60,61 to extend completely around sphere 12, in which instance the two hermispherical sections formed would require separate coolant inlets and outlets. The temperature of test sample 27 is measured by optical pyrometer 39. Movable monochromatic light source 32, maintained at the desired wave length, irradiates sample 27 such that the incident beam falls only on the sample. That is, the light beam is adjusted so as not to overfill test sample port 25 and with the test sample face being the only portion of the sphere wall irradiated. Reference sample 22 is irradiated by a separate fixed monochromatic light source 23. Detector 40 measures the radiation leaving the integrating sphere wall with the field of view of the detector or the "foot print" of the sphere wall.

To accurately determine the emissivity of test sample 27, the following procedure is adhered to:

(1) Take a reading, $m_{s1}$, with detector 40 when or while the hot sample 27 is irradiated by movable monochromatic light source 32; that is, while light source 32 is in the "on" mode.

(2) Repeat step (1) with the movable monochromatic light source 32 is in the "off" mode to get $m_{so}$ by detector 40. Light sources 32 and 23 are both in the "off" mode during this reading by detector 40 to ensure that no light reaches test sample 27.

(3) Take a reading, $m_{r1}$, by detector 40 while the reference sample is irradiated only by fixed monochromatic light source 23.

(4) Repeat step (3) with all light from fixed and movable sources 23 and 32 blocked off or in the "off" mode to get $m_{rl}$.

The spectral reflectivity, $\rho_{s\lambda}(\theta,\phi)$ of the sample 27 at the wavelength, $\lambda$, of the light source can be computed from $$R_\lambda(\theta,\phi) = \frac{m_{s1} - m_{so}}{m_{r1} - m_{ro}} \simeq \frac{\rho_{\lambda s}(\theta,\phi)}{\rho_{r\lambda}}$$

where $\rho_{r\lambda}$ is the spectral hemispherical reflectivity for the reference sample, $\rho_{s\lambda}(\theta,\phi)$ is the diffuse spectral reflectivity of the sample and, $\theta$ and $\phi$ are the viewing zenith and azimuth angles, respectively.

Thus, the directional spectral emissivity of sample at any corresponding temperature, T, can be computed as $$\epsilon_{s\lambda}(\theta,\phi) = 1 - \rho_{s\lambda}(\theta,\phi)$$

or $$\epsilon_{s\lambda}(\theta,\phi) = 1 - [R_\lambda(\theta,\phi) \cdot \rho_{r\lambda}].$$

The calculations may be made by state-of-the-art computer technology included in the data acquisition system and a readout thereof provided.

The above process is repeated for each incremental position of movable light source 32.

Referring more particularly to FIG. 5, as light source 32 is moved, slit port closure 63 is moved therewith and overlaps or slides over segmented auxiliary slit port closure 73. When the leading portion of slit port closure 63 covers the first segment of segmented auxiliary slit port closure 73, movable light source 32 has reached the point that, upon further movement, it will be obscured by that portion of segmented auxiliary slit port closure 73. The first segment of segmented auxiliary closure 73 is then slidably moved beneath movable light source 32 to open up another segment of slit port 33. This first segment of auxiliary slit port closure 73 is moved to a point along the circumference of sphere 12 as far as permitted toward the end of slit port 33 and covers a segment of slit port 33 adjacent the trailing portion of slit port closure 63. This procedure is repeated for each segment of segmented slit closure 73 until the leading portion of slit closure 63 covers the last segment of segmented auxiliary port closure 73 and all segments thereof have been moved toward the opposite end of slit port 33. When the trailing portion of slit port closure 63 has reached the point that it no longer covers slit port 33, segments of auxiliary slit port closure 73 will be always be in position to maintain slit port 33 covered. In this operation, slit port 33 is always closed, save for the space occupied by light source 32, by a member that has the same reflective coating thereon as that provided on the interior surface of wall 15.

In the illustrated embodiment, movement of slit port closure member 63 and segmented auxiliary slit port closure 73 toward sample port 25 is confined to the length of the respective grooves 68,69 and 78,79 formed within barrier walls 60,61. When leading portion of slit port closure 63 reaches the end of grooves 68,69 and all segments of segmented auxiliary slit port closure 73 have moved toward the opposite end of slit port 33, movable light 32 has reached the point that it can no longer focus onto sample 27 without overflowing. This position is substantially 20° from sample port 25 or approximately 160° from a point diametrically opposite to sample port 25 on integrating sphere 12, the beginning point of movement for movable light source 32. Grooves 68 and 78 on barrier wall 60 are illustrated in FIG. 5, and terminate at one end a distance short of sample port 25. Grooves 69 and 79 in barrier wall 61 also terminate at this point but are not shown in FIG. 5. Thus, when lands 65,66 on slit port closure 63 and lands 75,76 on segmented auxiliary slit port closure 73 reach the end of the respective grooves 68,69 and 78,79, no further movement thereof by slit port closure element 63 and the segments of auxiliary slit port closure 73 toward sample port 25 is permitted. The opposite ends of grooves 78,79 terminate at the other end of slit port 33, a point essentially diametrically opposite to sample port 25, while the opposite ends of grooves 68,69 for slit port closure element 63 extend beyond grooves 78,79 to accommodate the trailing portion of slit port closure 63. If desired, the position of slit port 33 could be rotated slightly on the circumference of integrating sphere 12 so as to not be in the path of sample port 25 and thereby permit further relative rotation of the movable monochromatic light source 32 about sphere 12.

Each segment in auxiliary slit port closure 73 is of equal length and also essentially equal in length to the leading portion of slit port closure element 63. The trailing portion of slit port closure element 63, that portion shown aft of movable light source 32 in FIG. 5, has a length at least as long as the leading portion and may have a length twice that of the leading portion, or longer. The specific length and number of the individual segments of auxiliary slit port closure 73 and that for the leading and trailing portion of slit closure 63 extending fore and aft from movable light source 32, are not considered critical and may vary with different size spheres. The essential feature being that at all stations of movable light source 32 along slit port 33, except for the space occupied by light source 32, slit port 33 is always closed by a member having the same reflective coating thereon as that provided on the interior surface of wall 15.

No specific dimensions have been recited for the various components of the invention, it being understood that port sizes would vary with different size spheres. In a specific example, sphere 12 has an internal radius of nine inches (22.86 cm) with port sizes in the range of 1-3 cm, except for sample port 25 and slit port 33. Sample port 25 has a diameter of approximately one and one-half inch, to accommodate a sample having a diameter of one inch. A circumferential sample clearance of one-quarter inch is thus provided between test sample 27 and tubular insulation sleeve 28. Slit port 33 has a width of approximately one-quarter inch, barrier walls 60,61 each have a wall thickness of one-sixteenth inch, with the distance therebetween being equal to the width of slit port 33. Paired grooves 68,69 and 78,79 are disposed approximately one-sixteenth inch from the top and bottom, respectively, of barrier walls 60,61. The slit port closure members 63,73 are thin enough to permit slidable clearance therebetween. When the system 10 is operated under vacuum conditions, slit port closure 63, attached movable monochromatic light source 32, and the segments of auxiliary slit port closure 73 are moved by suitable remote controls. When performing tests in ambient conditions, these parts may be manually moved.

In practice of the present invention, reflective coatings suitable for the interior of sphere 12 include Spectraflect ($BaSO_4$), Infragold (Gold) and MgO. These coatings are commercially available from the Labsphere Company. Infragold, a gold plating material, is preferable in that the coating obtained is uniform, stable and nondegradable, while having the essential high melting point temperature properties and ability to cover the complete wavelength from 0.25 to 25 μm.

As discussed hereinbefore, the uncoated part of sphere 12, for example the insulation 28 around test sample port 25 and the part of the sphere wall in contact therewith, is preferably formed of suitable ceramics or other suitable materials having a very high melting point and a very low thermal conductivity value.

The accuracy of emissivity measurements obtained by use of the present invention is enhanced by the speed in which the measurements are made. Thus, it is recommended that electronic switching components be employed to provide rapid turning on and off of the movable and fixed monochromatic light sources while obtaining the data by data acquisition system 42.

Although the invention has been described relative to specific embodiments thereof, it is not so limited. There are many variations and modifications of the invention that will be readily apparent to those skilled in the art in the light of the above teachings.

For example, instead of using both a movable and a fixed monochromatic light source, a single monochromatic light source may be employed to irradiate both the reference sample and the test sample in succession. This may be achieved by manually rotating the monochromatic light source so that it irradiates the appropriate sample. This may also be achieved by shining the monochromatic light source on a mirror and rotating the mirror such that the light shines on the appropriate sample. Other irradiation system modifications may also be possible and apparent to those skilled in the art.

It is therefore to be understood that, within the scope of the appended claims, the invention may be practiced other than as specifically described herein.

What is claimed as new and desired to be secured by Letters Patent of the United States is:

1. Apparatus for measuring the directional spectral emissivity of a material test specimen comprising, in combination:
   a system chamber,
   an integrating sphere housed within said chamber,
   said integrating sphere including a pair of spaced concentric walls,
   a highly reflective surface coating provided on the interior surface area of the innermost member of said pair of spaced concentric walls,
   coolant inlet and coolant outlet means in communication with said integrating sphere for circulating a coolant between said spaced concentric walls,
   a reference sample disposed within said integrating sphere,
   a fixed monochromatic light source disposed within said integrating sphere and in optical alignment with said reference sample,
   a test sample port extending through said spaced concentric walls of said integrating sphere,
   a test sample disposed within said test sample port,
   a pyrometer in optical alignment with said test sample serving to continuously measure the temperature of said test sample,
   an arcurate slit port disposed through said spaced concentric walls of said integrating sphere,
   a movable monochromatic light source extending through and movable along said arcurate slit port of said integrating sphere,
   means for closing said slit port save for the area therein occupied by said movable monochromatic light source,
   detector means extending through said spaced concentric walls of said integrating sphere for detecting and collecting temperature and radiation data from said reference sample and said test sample when said movable and said fixed monochromatic light sources are each in the on and off mode and at various temperatures and variable angle positions of said movable monochromatic light source,
   amplifier means connected to said detector means, and
   a data acquisition system receiving the amplified signal from said detector and converting said signal into a read-out of the directional spectral emissivity of said test sample as a function of the sample temperature as measured by said pyrometer.

2. The apparatus of claim 1 including a furnace for heating said reference sample housed within said system chamber, and means for selectively positioning said test sample within said furnace and within said test sample port.

3. The apparatus of claim 2 wherein said means for selectively positioning said test sample within said furnace and said test sample port includes a support rod, said test sample being secured to one end of said support rod, a closure element also secured to said support rod and disposed in spaced relationship to said test sample, said closure element serving to close said furnace when said test sample is positioned within said furnace, and a control mechanism for positioning said test sample within said test sample port and said furnace.

4. The apparatus of claim 3 including a black wall disposed adjacent said test specimen port, said black wall having an opening therein to permit said test specimen to pass therethrough when moved from said furnace to said test sample port, and said closure element serving to close said opening in said black wall when said test sample is positioned within said test sample port.

5. The apparatus of claim 2 including tubular insulation means disposed around said test sample port and wherein said means for selectively positioning said test sample within said furnace and said test sample port maintains said test sample within said test sample port such that a surface of said test sample is flush with and forms a portion of the interior wall of said integrating sphere.

6. The apparatus of claim 5 wherein the circumference of said test sample is maintained spaced from the interior of said tubular insulation means when said test sample surface is flush with and forms a portion of the interior wall of said integrating sphere.

7. The apparatus of claim 1 including furnace means for heating said test sample therein, said test sample being selectively movable from a position disposed within said test sample port to a position within said furnace means, a black wall disposed between said integrating sphere and said furnace means, an aperture in said black wall to permit passage of said test sample therethrough, a support rod attached to said test sample, a closure element secured to said support rod and in spaced relationship to said test sample, said closure element serving to close said furnace means when said test sample is heated therein and serving to close said aperture in said black wall when said test sample is disposed within said test sample port of said integrating sphere.

8. The apparatus of claim 1 wherein said means for closing said slit port save for the area therein occupied by said movable monochromatic light source includes, a pair of spaced barrier walls disposed about a portion of the circumferential exterior surface of said integrating sphere and extending diametrically from the inside concentric wall portion to the exterior wall portion with the area of said concentric walls disposed between said spaced barrier walls being removed to form said slit port, a thin arcuate slit port closure member attached to and extending from each side of said movable monochromatic light source, said thin arcuate slit closure member being arcurately movable along and between said spaced barrier walls to maintain said slit port closed as said movable monochromatic light source is moved.

9. The apparatus of claim 8 including a segmented auxiliary slit port closure slidably disposed between said pair of spaced barrier walls, each segment of said auxiliary slit port closure having a thin arcuate configuration and slidably movable between said pair of spaced barrier walls, a first pair of grooves disposed in facing relationship and formed, one each, on the interior surface of each member of said spaced barrier walls, a second pair of grooves disposed in facing relationship and formed in spaced relationship to said first pair of grooves, one each on the interior surface of each member of said spaced barrier walls, said thin arcuate slit closure member attached to and extending from said movable monochromatic light source having laterally extending ears or lands on both sides and along the length thereof and slidably engaged within said first pair of grooves to permit slidable movement of said thin arcuate slit closure member along said first pair of grooves, each segment of said segmented auxiliary slit port closure member being also provided with laterally extending ears or lands on both sides and along the length thereof and slidably engaged within said second pair of groove to permit slidable movement of said auxiliary slit port closure along said second pair of grooves.

10. The apparatus of claim 9 wherein said first and said second pair of grooves are positioned to permit each segment of said segmented auxiliary slit port closure to slidably move beneath said slit port closure member attached to said movable monochromatic light source.

11. The apparatus of claim 9 wherein said slit port closure attached to said movable monochromatic light source and said segmented auxiliary slit port closure member are each provided with a surface area coating identical to that on the interior surface area of said integrating sphere.

12. The apparatus of claim 11 wherein said segmented auxiliary slit port closure member comprises a plurality of independent segments with each said segment being of an arcuate configuration and provided with laterally extending lands or ears on both sides thereof.

13. The apparatus of claim 12 wherein said thin arcuate closure member is provided with a leading portion and a trailing portion relative to said movable monochromatic light source and wherein said leading portion has a length at least equal to the length of one segment of said segmented auxiliary slit port closure.

14. Apparatus for measuring the directional spectral emissivity of a test sample comprising:

an integrating sphere having a highly reflective coating on the interior surface thereof,
a heated test sample disposed within a test sample port formed through said integrating sphere,
means for selectively exposing said test sample to a source of monochromatic light,
means for detecting the radiation reflected by said test sample when exposed to said monochromatic light source and when not exposed to said light source,
a reference sample disposed within a port formed through said integrating sphere,
means for selectively exposing said reference sample to a source of monochromatic light,
means for detecting the radiation reflected by said reference sample when exposed to said monochromatic light source and when not exposed to said light source, and
means for comparing the detected radiation values of said test sample and said reference sample and using this comparison to determine the directional spectral emissivity of the test sample at any specific temperature.

15. The apparatus of claim 14 wherein said highly diffuse reflective coating on the inside of said integrating sphere is selected from the group of highly diffuse reflective coatings consisting of $BaSO_4$, $MgO$, and $Au$.

16. The apparatus of claim 14 wherein said highly diffuse reflective coating is a gold plating.

17. The apparatus of claim 14 including a pyrometer for measuring the temperature of said test sample, and wherein said means for exposing said test sample to a source of monochromatic light comprises a movable monochromatic light source.

18. A method of determining the emissivity of a material test sample comprising:
providing an integrating sphere having a plurality of ports through the wall thereof,
providing a heated test sample within a first port extending through the integrating sphere wall,
positioning a detector having a variable filter thereon through a second port in the integrating sphere wall,
providing a reference sample within a third port extending through the integrating sphere wall,
providing a movable monochromatic light source extending through a slit port in the integrating sphere wall and in optical alignment with the test sample,
providing a fixed monochromatic light source extending through a fourth port in the integrating sphere wall and in optical alignment with the reference sample,
providing a pyrometer extending through a fifth port in the integrating sphere and in optical alignment with the test specimen,
employing the pyrometer to take a reading (T) of the temperature of the heated test specimen,
while maintaining the fixed monochromatic light source off, exposing the heated test sample to radiation from the movable monochromatic light source,
taking a reading $m_{s1}$ with the detector while the heated test sample is irradiated by the movable monochromatic light source,
turning the movable monochromatic light source off and taking a reading $m_{so}$ with the detector, while maintaining the movable monochromatic light source off, exposing the reference sample to radiation from the fixed monochromatic light source, taking a reading $m_{r1}$ with the detector, turning the fixed monochromatic light source off and taking a reading $m_{ro}$ with the detector, employing the readings taken by the detector to compute the spectral reflectivity $\rho_{s\lambda}(\theta,\phi)$ for the wavelength $\lambda$ by the equation:

$$R_\lambda(\theta,\phi) = \frac{m_{s1} - m_{so}}{m_{r1} - m_{ro}} \simeq \frac{\rho_{\lambda s}(\theta,\phi)}{\rho_{r\lambda}}$$

where $\rho_{r\lambda}$ is the known spectral diffuse reflectivity of the reference sample, $\rho_{s\lambda}(\theta, \phi)$ is the spectral reflectivity of the test sample, and $\theta$ and $\phi$ are the viewing zenith and azimuth angles, respectively, computing the directional spectral emissivity of the test sample at temperature (T) by the equation $$\epsilon_{s\lambda}(\theta, \phi) = 1 - \rho_{s\lambda}(\theta, \phi)$$

or $$\epsilon_{s\lambda}(\theta, \phi) = 1 - [R_\lambda(\theta, \phi) \cdot \rho_{r\lambda}]$$

* * * * *